United States Patent [19]
Fauran et al.

[11] 3,755,314
[45] Aug. 28, 1973

[54] NOVEL 2-ACRYLOYL BENZIMIDAZOLES, THEIR PROCESS OF PREPARATION AND THEIR THERAPEUTIC APPLICATION

[75] Inventors: Claude P. Fauran, Paris; Jeannine A. Eberle, Chatou; Guy M. Raynaud, Paris; Janine M. Thomas, Neuilly, all of France

[73] Assignee: Delalande S.A., Courbevoie (Hauts-de-Seine), France

[22] Filed: Nov. 26, 1971

[21] Appl. No.: 202,637

[30] Foreign Application Priority Data
Dec. 1, 1970 France .............................. 7043089

[52] U.S. Cl. .............. 260/240 J, 424/263, 424/273
[51] Int. Cl. ............................................. C07d 49/38
[58] Field of Search ...................... 260/240 J, 309.2

[56] References Cited
UNITED STATES PATENTS
2,754,299 7/1956 Deutsch et al. .................. 260/240 J
3,577,419 5/1971 Griot ............................ 260/240 J X OTHER PUBLICATIONS
Staab et al., Chem. Ber. Vol. 99, pages 2955 to 2961 (1966).

Primary Examiner—John D. Randolph
Attorney—Woodhams, Blanchard & Flynn

[57] ABSTRACT
A compound of the formula

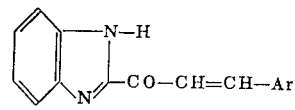

in which Ar is unsubstituted phenyl, phenyl mono- or di-substituted by halogen, alkoxy having one to six carbon atoms or dimethylamino, 2-furyl, 2-thienyl or 3-pyridyl. The compounds are prepared by reacting 2-acetyl benzimidazole with an aldehyde of the formula ArCHO. The compounds possess hypotensive and diuretic properties.

2 Claims, No Drawings

NOVEL 2-ACRYLOYL BENZIMIDAZOLES, THEIR PROCESS OF PREPARATION AND THEIR THERAPEUTIC APPLICATION

The present invention relates to novel 2-acryloyl benzimidazoles, their process of preparation and their therapeutic application.

The novel compounds in accordance with the present invention correspond to the general formula:

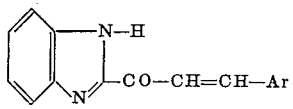

(I)

in which Ar represents:
- a phenyl radical which is either unsubstituted or mono- or di-substituted by a halogen atom, an alkoxy radical containing one to six carbon atoms, or a dimethylamino radical, or
- a heterocyclic radical selected from 2-furyl, 2-thienyl and 3-pyridyl.

The process for preparing the compounds in accordance with the present invention comprises condensing 2-acetyl benzimidazole of the formula:

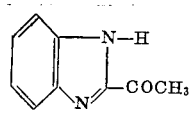

(II)

with an aldehyde of the general formula:

$$Ar - CHO$$

(III)

in which Ar has the same signification as in formula (I).

The following preparations are given by way of example to illustrate the present invention.

EXAMPLE 1

2-(p-methoxy cinnamoyl) benzimidazole (Code No. 69345)

To an ethanolic solution of sodium ethanolate prepared from 50 ml of ethyl alcohol and 3.3 g of sodium, there is added, with agitation and at ambient temperature, 0.1 mol of p-methoxy benzaldehyde in solution in 10 ml of ethanol and then 0.1 mol of 2-acetyl benzimidazole. There is an increase in temperature of 5°C. After agitation of the reaction mixture for 3 hours an orange solution is obtained. This solution is diluted with 250 ml of water and neutralized to a pH of 7 – 8, with agitation, with 5 times diluted acetic acid. The precipitate formed is filtered, and washed with a small amount of 50° ethanol and recrystallised from 95° methanol.

Melting point = 201°C
Yield = 72%
Empirical formula = $C_{17}H_{14}N_2O_2$

| Elementary analysis: | C | H | N |
|---|---|---|---|
| Calculated % | 73.36 | 5.03 | 10.07 |
| Found % | 73.38 | 4.80 | 10.20 |

EXAMPLE 2

2-(3',4'-dichloro cinnamoyl) benzimidazole (Code No. 70156)

0.1 mol of concentrated soda and 3 ml of 2N soda are added to a solution of 0.1 mol of 2-acetyl benzimidazole and 3,4-dichloro benzaldehyde in 100 ml of ethanol. The temperature increases by 6°C. The reaction mixture is allowed to cool to ambient temperature which takes four hours. The mixture is then diluted with 350 ml of water, and is then neutralised, with agitation, with 30 ml of 5 times diluted acetic acid. The precipitate is filtered, washed with water, dried and recrystallised from chloroform or an ethyl acetate-dimethylformamide mixture.

Melting point = 215°C
Yield = 32%
Empirical formula = $C_{16}H_{10}Cl_2N_2O$

| Elementary analysis: | C | H | N |
|---|---|---|---|
| Calculated % | 60.58 | 3.18 | 8.83 |
| Found % | 60.37 | 3.38 | 9.01 |

The compounds listed in the following table I have been prepared according to the preceding examples.

TABLE I

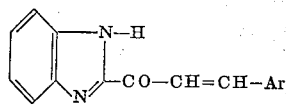

| | | | | | | Elementary analysis | | | | | |
|---|---|---|---|---|---|---|---|---|---|---|---|
| | | | | | | Calculated | | | Found | | |
| Code No. | Ar | Empirical formula | Molecular weight | Melting point (° C.) | Yield (percent) | C | H | N | C | H | N |
| 68 45 | –⟨phenyl⟩ | $C_{16}H_{12}N_2O$ | 248.27 | 216 | | 77.40 | 4.87 | 11.28 | 77.35 | 5.16 | 11.31 |
| 69 309 | –⟨phenyl⟩–Cl | $C_{16}H_{11}ClN_2O$ | 282.72 | 235 | 46 | 67.97 | 3.92 | 9.91 | 67.77 | 3.76 | 9.81 |
| 70 42 | –⟨phenyl⟩(OCH₃)(OCH₃) | $C_{18}H_{16}N_2O_3$ | 308.32 | 210 | 66 | 70.11 | 5.23 | 9.09 | 70.26 | 5.33 | 8.96 |
| 70 44 | –⟨phenyl⟩(OCH₃)(OCH₃)(OCH₃) | $C_{19}H_{18}N_2O_4$ | 338.35 | 213 | 63 | 67.44 | 5.36 | 8.28 | 67.53 | 5.50 | 5.— |

TABLE I – Continued

| Code No. | Ar | Empirical formula | Molecular weight | Melting point (°C.) | Yield (percent) | Calculated C | Calculated H | Calculated N | Found C | Found H | Found N |
|---|---|---|---|---|---|---|---|---|---|---|---|
| 70 95 | 2-furyl | $C_{14}H_{10}N_2O_2$ | 238.23 | 216 | 49.5 | 70.58 | 4.23 | 11.76 | 70.49 | 4.30 | 11.54 |
| 70 97 | 2-thienyl | $C_{14}H_{10}N_2OS$ | 254.30 | 224 | 76.5 | 66.12 | 3.96 | 11.02 | 66.33 | 4.08 | 11.09 |
| 70 112 | 3-pyridyl | $C_{15}H_{11}N_3O$ | 249.26 | 238 | 67 | 72.27 | 4.45 | 16.86 | 72.06 | 4.55 | 16.6 |
| 70 180 | p-(dimethylamino)phenyl | $C_{18}H_{17}N_3O$ | 291.34 | 260 | 63 | 74.20 | 5.88 | 14.42 | 74.13 | 5.84 | 14.63 |

The compounds of formula (I) have been tested on animals in the laboratory and have been shown to possess hypotensive and diuretic properties.

1. — Hypotensive properties

The compounds of formula (I) administered by intraveinous or introduodenal means to an anaesthetised rat, provoke a lowering of the arterial pressure.

By way of example, the results obtained with certain compounds of formula (I) are given in the following table II:

TABLE II

| Code No. of compound tested | Dose administered | Diminution of arterial pressure Intensity | Diminution of arterial pressure Duration |
|---|---|---|---|
| 6845 | 20 mg/kg/ID | 40% | <60 mm |
| 69 309 | 20 mg/kg/ID | 25% | 50 mm |
| 69 345 | 10 mg/kg/ID | 40% | <40 mn |
| 70 112 | 10 mg/kd/ID | 30% | <30 mn |
| 70 180 | 20 mg/kg/ID | 40% | <30 mn |

2. — Diuretic properties

The compounds of formula (I) administered by oral means to a mouse and to a rat, simultaneously with an isotonic solution of sodium chloride, by means of 1 ml per 25g of the corporeal weight of the mouse and 2.5 ml per 100g of the corporeal weight of the rat, are capable of provoking an augmentation of the volume of urine emitted compared to a standard, the volume being measured for the four hour period following administration.

By way of example, the administration of 10 mg/kg/PO of compound No. 69345 augments urinary elimination by 45 percent.

The compounds according to the invention exhibit an extremely weak toxicity since administered at the rate of 2g/kg/PO to the mouse, none of the compounds Nos. 6845, 69309, 69345, 70112 and 70180 provoke mortality.

As a result of the above-listed results, the difference between the pharmacologically-active dose and the lethal dose is sufficiently great to enable the compounds of the general formula (I) to be used in therapeutics.

The compounds of formula (I) are useful in the treatment of hypertensions and oedemas. They may be administered by oral means in the form of tablets, dragees and gelules containing 50 to 350 mg of active ingredient (1 to 3 times a day) and by rectal means in the form of suppositories containing 50 to 350 mg of active ingredient (1 or 2 times a day).

Accordingly, the present invention also relates to a pharmaceutical composition comprising a compound of the general formula (I) together with a pharmaceutically-acceptable carrier.

What we claim is:

1. A compound of the formula:

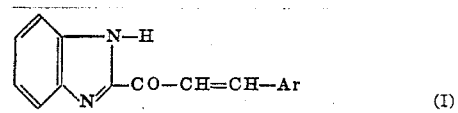

(I)

in which Ar represents:
- a phenyl radical which is either unsubstituted or mono- or di-substituted by a halogen atom, an alkoxy radical containing one to six carbon atoms or a dimethylamino radical, or
- a heterocyclic radical selected from 2-furyl, 2-thienyl and 3-pyridyl.

2. A compound according to claim 1, in which Ar is p-methoxy phenyl.

* * * * *